US012584506B2

(12) United States Patent (10) Patent No.: US 12,584,506 B2
Stahl et al. (45) Date of Patent: Mar. 24, 2026

(54) SECURING ELEMENT AND COVER FOR AN INTERIOR MIRROR BASE OF A MOTOR VEHICLE

(71) Applicant: Bayerische Motoren Werke Aktiengesellschaft, Munich (DE)

(72) Inventors: Stefanus Stahl, Holzkirchen (DE); Martin Friedrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 287 days.

(21) Appl. No.: 18/286,585

(22) PCT Filed: Jul. 8, 2022

(86) PCT No.: PCT/EP2022/069040
§ 371 (c)(1),
(2) Date: Oct. 12, 2023

(87) PCT Pub. No.: WO2023/001586
PCT Pub. Date: Jan. 26, 2023

(65) Prior Publication Data
US 2024/0191733 A1 Jun. 13, 2024

(30) Foreign Application Priority Data

Jul. 20, 2021 (DE) ..................... 10 2021 118 656.0

(51) Int. Cl.
*F16B 2/22* (2006.01)
*B22F 10/28* (2021.01)
(Continued)

(52) U.S. Cl.
CPC ................ *F16B 2/22* (2013.01); *B22F 10/28* (2021.01); *B33Y 70/00* (2014.12); *B33Y 80/00* (2014.12); *B60R 1/04* (2013.01)

(58) Field of Classification Search
CPC ........ F16B 2/22; F16B 2200/91; B22F 10/28; B33Y 70/00; B33Y 80/00; B60R 1/04
See application file for complete search history.

(56) References Cited

U.S. PATENT DOCUMENTS 8,251,626 B1 * 8/2012 Gonzalez .............. F16B 21/086
411/509
2004/0207940 A1 10/2004 Carter et al.
(Continued)

FOREIGN PATENT DOCUMENTS

CN 86 2 05465 U 8/1987
CN 103000596 A 3/2013
(Continued)

OTHER PUBLICATIONS

College Physics "13.2 Thermal Expansion of Solids and Liquids" Aug. 22, 2016 by OpenStax https://pressbooks.online.ucf.edu/phy2053bc/chapter/thermal-expansion-of-solids-and-liquids/ (Year: 2016).*

(Continued)

*Primary Examiner* — Michael M. Robinson
(74) *Attorney, Agent, or Firm* — Crowell & Moring LLP

(57) ABSTRACT

A securing element for a motor vehicle has a hermetic body made of plastic which encloses a cavity. The cavity is filled with a filling medium. The thermal expansion coefficient of the filling medium is, up to a softening temperature of the plastic, greater than the thermal expansion coefficient of the plastic. A cover for an interior mirror base of a motor vehicle includes such a securing element.

12 Claims, 1 Drawing Sheet

(51) Int. Cl.
    *B33Y 70/00*         (2020.01)
    *B33Y 80/00*         (2015.01)
    *B60R 1/04*         (2006.01)

(56)           References Cited

U.S. PATENT DOCUMENTS

| | | | |
|---|---|---|---|
| 2013/0064627 A1 | 3/2013 | Beeler | |
| 2015/0191130 A1* | 7/2015 | Kuhn ..................... | B60R 11/00 |
| | | | 248/288.51 |
| 2020/0040183 A1* | 2/2020 | Krishnaswamy ....... | C08L 77/06 |

FOREIGN PATENT DOCUMENTS

| | | |
|---|---|---|
| CN | 204785947 U | 11/2015 |
| CN | 105852310 A | 8/2016 |
| CN | 203161726 U | 8/2018 |
| DE | 10 2017 101 834 A1 | 8/2018 |
| DE | 10 2017 124 310 A1 | 4/2019 |
| DE | 10 2020 100 651 A1 | 7/2021 |
| FR | 2 789 130 A1 | 8/2000 |

OTHER PUBLICATIONS

English machine translation, DE 102020100651A1, Espacenet, obtained Sep. 29, 2025 (Year: 2025).*

International Search Report (PCT/ISA/210) issued in PCT Application No. PCT/EP2022/069040 dated Nov. 15, 2022 with English translation (4 pages).

German-language Written Opinion (PCT/ISA/237) issued in PCT Application No. PCT/EP2022/069040 dated Nov. 15, 2022 with English translation 7 pages).

German Search Report issued in German Application No. 10 2021 118 656.0 dated Mar. 4, 2022 with partial English translation (9 pages).

English translation of Chinese-language Office Action issued in Chinese Application No. 202280022816.7 dated Nov. 25, 2025 (8 pages).

* cited by examiner

SECURING ELEMENT AND COVER FOR AN INTERIOR MIRROR BASE OF A MOTOR VEHICLE

BACKGROUND AND SUMMARY

The present invention relates to a securing element for a motor vehicle, and to a cover for an interior mirror base of a motor vehicle having such a securing element.

Securing elements, such as hooks for attaching a first component to a second component, are known from the prior art. The hook is fixed to a first of the components and hooked to the second component. The hooking causes tensile stresses in the hook. Therefore, when the hook heats up, plastic elongation of the hook occurs as soon as the softening temperature of the material of the hook is reached or exceeded. The plastic elongation of the hook loosens the attachment of the first component to the second component, with the result that the reliability of the attachment falls and noises such as creaking and/or rattling occur.

The object of the present invention is to provide a securing element which ensures a secure attachment of a first component to a second component even in the case of temperature variation without the occurrence of unpleasant noises such as creaking and/or rattling.

This object is achieved by the securing element and by a cover for an interior mirror base of a motor vehicle having such a securing element, in accordance with the features of the independent claims.

Provision is thus made according to the invention of a securing element for a motor vehicle for attaching a first component to a second component and comprising a hermetic body made of plastic. The body encloses a cavity. The cavity contains a filling medium. In connection with the present invention, a "hermetic body" is understood to mean an absolutely tight body, in particular a body that prevents the filling medium from escaping. The coefficient of thermal expansion and therefore the thermal expansion of the filling medium, at least up to a softening temperature of the plastic of the body, is greater than the coefficient of thermal expansion, and the thermal expansion, of the plastic. In connection with the present invention, "softening temperature" should be understood to mean the temperature from which the plastic of the body undergoes plastic and therefore permanent deformation. The softening temperature may also be a temperature range.

The core concept of the invention is thus that the hermetic body is provided with a filling medium that changes its volume to a more pronounced extent, i.e. expands or shrinks to a more pronounced extent, than the plastic of the body when the temperature changes. When the securing element cools, the filling medium thus shrinks to a more pronounced extent than the body, as a result of which a reduced pressure arises in the cavity and the securing element is brought into a prestressed position.

In an advantageous embodiment of the securing element according to the invention, the plastic from which the body is formed is a polyamide.

The polyamide is for example a polyamide 11 (PA11).

In an exemplary embodiment of the securing element according to the invention, the securing element is additively manufactured.

The filling medium comprises for example at least one gas, at least one liquid, and/or at least one solid.

The solid may be a powder.

The gas is for example air.

In a preferred embodiment of the securing element according to the invention, the filling medium comprises at least one gas and at least one solid in powder form.

The proportion by volume of the gas in the total volume of the filling medium is for example 60 to 70 percent by volume.

In an exemplary embodiment, the securing element according to the invention comprises a powder.

The body may comprise the powder in completely remelted form.

The body may be formed from the powder in completely remelted form.

The filling medium comprises the powder for example in powder form and/or partially remelted form. The powder in the filling medium results in acoustic damping of the securing element.

In a preferred embodiment of the securing element according to the invention, the powder is remelted or partially remelted by way of powder bed fusion.

The powder may be remelted or partially remelted by use of multi-jet fusion, by use of selective laser sintering, by use of selective laser melting or by use of electron beam melting.

The body may be produced by resin-based or filament-based additive manufacturing processes.

For example, at least one partition wall is provided in the cavity for the defined control of a deformation of the body when the temperature changes.

The partition wall divides the cavity for example into subchambers.

The subchambers are for example hermetically sealed or connected to one another.

It is also possible to provide a plurality of partition walls which form a kind of labyrinth.

At least one connecting web may also be arranged in the cavity for the defined control of a deformation of the body when the temperature changes, which connecting web connects walls delimiting the cavity to one another, a wall delimiting the cavity to a partition wall or partition walls to one another.

In a preferred embodiment of the securing element according to the invention, the securing element is a mounting hook, in particular a snap-action hook.

Furthermore, the present invention relates to an interior lining of an exterior mirror of a motor vehicle which comprises a securing element described above.

The invention will be explained in more detail below on the basis of exemplary embodiments illustrated in the drawings.

DETAILED DESCRIPTION OF THE DRAWINGS

Figure 1:
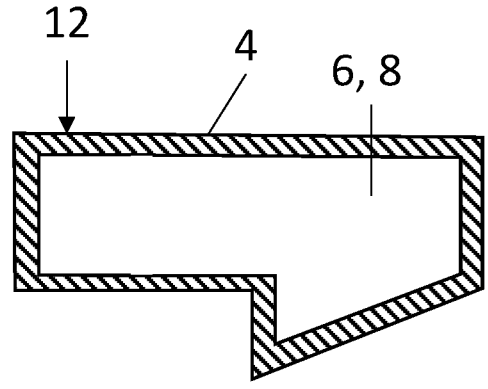
FIG. 1 is a sectional view of a first securing element according to an embodiment of the invention.

FIG. 1 shows a first securing element 12 according to an embodiment of the invention. The first securing element 12 comprises a hermetic (hollow) body 4 made of plastic and a cavity 6.

The first securing element 12 is in the form of a hook and has been produced from a powder by means of an additive manufacturing process.

The cavity 6 of the first securing element 12 is filled with a filling medium. The filling medium is a gas 8. The gas 8, at least up to a softening temperature of the plastic from which the body 4 is formed, has a higher coefficient of thermal expansion than the plastic.

When the first securing element 12 heats up, the gas 8 in the cavity therefore expands to a more pronounced extent than the plastic of the body 4. Likewise, when the first securing element 12 cools, the gas 8 in the cavity 6 contracts to a more pronounced extent than the plastic of the body 4. Therefore, when the temperature increases up to the softening temperature, the body 4 undergoes elastic deformation, which then resets in the case of cooling, assisted by a reduced pressure in the cavity 6. The body 4 thus returns to its initial configuration or starting position.

Figure 2:
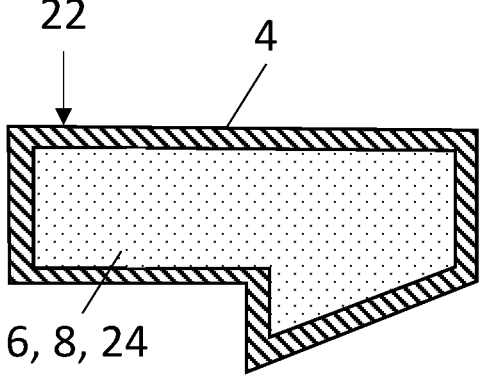
FIG. 2 is a sectional view of a second securing element according to an embodiment of the invention.

FIG. 2 shows a second securing element 22. The second securing element 22 differs from the first securing element 12 shown in FIG. 1 only by the filling medium provided in the cavity 6. The explanations that follow are consequently restricted to a description of the filling medium. Reference is made to the above description of the first securing element 12 with regard to the further configuration of the second securing element 22.

The second securing element 22 contains a filling medium comprising a gas 8 and a powder 24. The powder 24 is the same powder from which the body 4 has been produced. The powder 24 provides vibration-damping properties.

Figure 3:
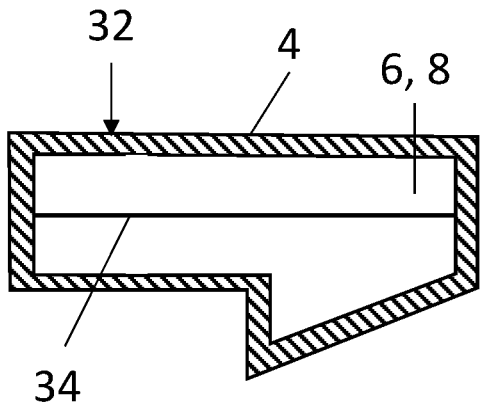
FIG. 3 is a sectional view of a third securing element according to an embodiment of the invention.
Figure 4:
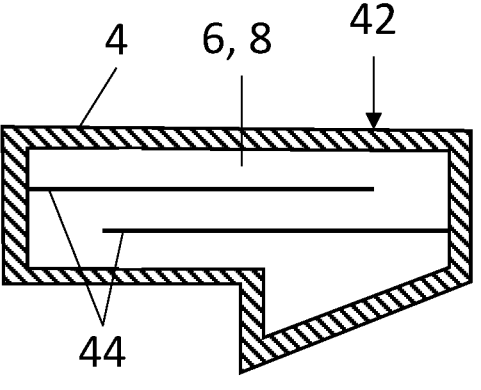
FIG. 4 is a sectional view of a fourth securing element according to an embodiment of the invention.
Figure 5:
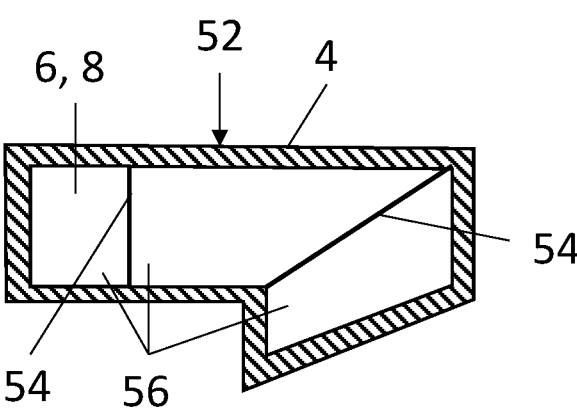
FIG. 5 is a sectional view of a fifth securing element according to an embodiment of the invention.

FIGS. 3, 4 and 5 show a third securing element 32, a fourth securing element 42 and a fifth securing element 52 according to the invention, respectively.

With the exception of the features described below, the third securing element 32, the fourth securing element 42 and the fifth securing element 52 correspond to the securing element 12 shown in FIG. 1, for which reason reference is made to the above description of the first securing element 12 with regard to the further configuration of the third securing element 32, of the fourth securing element 42 and of the fifth securing element 52.

The third securing element 32 comprises a connecting web 34 which connects two opposite side walls delimiting the cavity 6.

The fourth securing element 42 and the fifth securing element 52 each comprise two partition walls 44 and 54, respectively.

The partition walls 44 of the fourth securing element 42 form a kind of labyrinth which forms an air channel for the gas 8 contained in the cavity 6.

The cavity 6 of the fifth securing element 52 is divided into subchambers 56 by means of the partition walls 54.

The connecting web 34, the partition walls 44 and the partition walls 54 each enable a controlled thermal expansion and consequently a controlled (elastic) deformation of the third securing element 32, of the fourth securing element 42 and of the fifth securing element 52.

LIST OF REFERENCE SIGNS

4 (hollow) body
6 cavity
8 gas
12 securing element
22 securing element
24 powder
32 securing element

34 connecting web
42 securing element
44 partition wall
52 securing element
54 partition wall
56 subchamber

What is claimed is:

1. A securing element for a motor vehicle, comprising:
a hermetic body made of plastic which encloses a cavity, the plastic having a defined coefficient of thermal expansion;
a filling medium in the cavity, the filling medium having a defined coefficient of thermal expansion, wherein
the coefficient of thermal expansion of the filling medium, at least up to a softening temperature of the plastic, is greater than the coefficient of thermal expansion of the plastic,
wherein
the hermetic body has a prestressed initial configuration comprising a reduced pressure in the cavity, and
the hermetic body is configured to undergo elastic deformation at temperatures up to the softening temperature of the plastic, and to reset to the prestressed initial configuration upon cooling, assisted by the reduced pressure in the cavity.

2. The securing element according to claim 1, wherein the plastic is a polyamide.

3. The securing element according to claim 1, wherein the securing element is an additively manufactured securing element.

4. The securing element according to claim 1, wherein the securing element is additively manufactured from a powder, a resin, or a filament.

5. The securing element according to claim 4, wherein the powder is remelted or partially remelted via powder bed fusion.

6. The securing element according to claim 1, wherein the filling medium comprises at least one gas, at least one liquid, and/or at least one solid.

7. The securing element according to claim 6, wherein a proportion of the at least one gas in the filling medium is 60 to 70 percent by volume of a total volume of the filling medium.

8. The securing element according to claim 1, further comprising:
at least one partition wall and/or at least one connecting web arranged in the cavity, wherein
a connecting web connects walls delimiting the cavity to one another, a wall delimiting the cavity to a partition wall, or two partition walls to one another.

9. The securing element according to claim 1, wherein the securing element is a mounting hook.

10. An assembly, comprising:
an interior mirror base of a motor vehicle; and
a cover for the interior mirror base of the motor vehicle, wherein
the cover includes a securing element comprising:
a hermetic body made of plastic which encloses a cavity, the plastic having a defined coefficient of thermal expansion;
a filling medium in the cavity, the filling medium having a defined coefficient of thermal expansion, wherein
the coefficient of thermal expansion of the filling medium, at least up to a softening temperature of the plastic, is greater than the coefficient of thermal expansion of the plastic, wherein the hermetic body has a prestressed initial configuration comprising a reduced pressure in the cavity, and the hermetic body is configured to undergo elastic deformation at temperatures up to the softening temperature of the plastic, and to reset to the pre-stressed initial configuration upon cooling, assisted by the reduced pressure in the cavity.

11. The assembly of claim 10, wherein the filling medium includes a gas and a powder.

12. The securing element of claim 1, wherein the filling medium includes a gas and a powder.

\* \* \* \* \*